United States Patent
Parker

(10) Patent No.: US 8,992,151 B2
(45) Date of Patent: Mar. 31, 2015

(54) TAMPER-RESISTANT FASTENER

(71) Applicant: Parker Fasteners, LLC, Goodyear, AZ (US)

(72) Inventor: Robert Parker, Surprise, AZ (US)

(73) Assignee: Parker Fasteners, LLC, Goodyear, AZ (US)

( * ) Notice: Subject to any disclaimer, the term of this patent is extended or adjusted under 35 U.S.C. 154(b) by 0 days.

(21) Appl. No.: 14/107,644

(22) Filed: Dec. 16, 2013

(65) Prior Publication Data

US 2014/0363257 A1    Dec. 11, 2014

Related U.S. Application Data

(60) Provisional application No. 61/832,070, filed on Jun. 6, 2013.

(51) Int. Cl.
| | |
|---|---|
| *F16B 35/06* | (2006.01) |
| *F16B 23/00* | (2006.01) |
| *F16B 41/00* | (2006.01) |

(52) U.S. Cl.
CPC ......... *F16B 23/0046* (2013.01); *F16B 23/0007* (2013.01); *F16B 41/005* (2013.01)
USPC .......................................... 411/403; 411/402

(58) Field of Classification Search
USPC .......... 411/402, 403, 407, 410, 427, 910, 911
See application file for complete search history.

(56) References Cited

U.S. PATENT DOCUMENTS

| | | | |
|---|---|---|---|
| 2,397,216 A | | 3/1946 | Stellin |
| 2,813,450 A | * | 11/1957 | Dzus .............................. 411/403 |
| 3,241,408 A | | 3/1966 | McCauley |
| 3,584,667 A | | 6/1971 | Reiland |
| 3,874,258 A | | 4/1975 | Semola et al. |
| 4,018,111 A | | 4/1977 | Goldhaber |
| 4,258,596 A | | 3/1981 | Bisbing et al. |
| 4,426,896 A | | 1/1984 | Kesselman |
| 4,938,108 A | | 7/1990 | Mekler |
| 5,207,132 A | | 5/1993 | Goss et al. |
| 5,269,208 A | | 12/1993 | Kolvites et al. |
| 5,378,101 A | | 1/1995 | Olson et al. |
| 5,598,753 A | | 2/1997 | Lee |
| D415,676 S | * | 10/1999 | Negishi et al. .................. D8/387 |
| 6,186,718 B1 | * | 2/2001 | Fogard ........................... 411/403 |
| 6,295,900 B1 | * | 10/2001 | Julicher et al. .................. 81/436 |
| D524,637 S | | 7/2006 | Schluter |
| 8,388,294 B2 | * | 3/2013 | Lanneree ....................... 411/403 |
| 8,540,756 B2 | * | 9/2013 | Olsen et al. .................... 606/305 |
| 2007/0207008 A1 | * | 9/2007 | Flesher ........................... 411/403 |
| 2009/0129887 A1 | * | 5/2009 | Chang ........................... 411/402 |

* cited by examiner

*Primary Examiner* — Roberta Delisle
(74) *Attorney, Agent, or Firm* — Hartman Titus PLC; John D. Titus

(57) ABSTRACT

A tamper-resistant fastener includes a non-circular drive recess optionally with a non-circular center post. Preferably the recess and center post are at least partially ellipsoidal cylinders that are concentric and aligned (i.e. they share a common major axis direction). This configuration forms a slot having preferably a substantially uniform width into which an authorized driver is inserted. The length of the major maximum dimension of the post is selected so that a circular arc tangent to the maximum radius of the post will pass closely to or intersect the minimum radial dimension of the recess.

19 Claims, 4 Drawing Sheets

TAMPER-RESISTANT FASTENER

BACKGROUND OF THE INVENTION

This invention relates generally to threaded fasteners, and in particular to tamper-resistant threaded fasteners.

It is well known in the art to provide nuts, bolts and other fasteners with various anti-tampering features designed to make it difficult for unauthorized persons to remove a part, gain access to a piece of equipment, or otherwise disassemble an object where such fasteners have been employed. A first variety of anti-tamper fasteners have a drive portion that sheers off when a certain torque is reached, leaving a smooth surface that is difficult to remove. The disadvantage of these anti-tamper fasteners, however, is that authorized persons cannot remove them without resorting to crude methods that inevitably leave the fastener mutilated. A second variety of anti-tamper fasteners are designed to resist removal except when a driver specifically designed for the fastener is used (e.g. by an authorized person). U.S. Pat. No. 4,938,108 issued to Mekler provides a relatively comprehensive background summarizing various of these type of anti-tamper fastener designs.

A popular method of providing an anti-tamper feature for a fastener used with a special driver is to design the fastener to have a recessed drive socket (hex, TORX®, Bristol, Phillips, etc.) with a center pin or post designed to prevent insertion of a screwdriver, knife, or other tool that does not exactly match the profile of the recessed drive/post combination. The TORX® TR is a popular version of center-post anti-tamper fasteners.

A disadvantage of center-post type anti-tamper fasteners, however, is that because the center post is cylindrical, a determined thief can fabricate a tool for removing the anti-tamper fastener simply by drilling a hole through the center of a conventional hex, TORX®, Bristol, or Phillips driver thereby defeating the anti-tamper feature. Another disadvantage is the center post, being cylindrical, does not transmit any torque when using an authorized drive tool and, therefore, the recess must carry the entire load.

SUMMARY OF THE INVENTION

The present invention overcomes the foregoing disadvantages by providing a fastener with drive recess that is non-circular in cross section. In a preferred embodiment, the fastener includes a recess that is at least partially an ellipsoidal cylindrical recess, in combination with a center post that is similarly elongated, preferably at least partially an ellipsoidal cylinder that is concentric with and aligned with (i.e. shares a common major axis direction with) the recess. This configuration forms a slot having an average width, preferably having a substantially uniform width into which an authorized driver is inserted. The length of the maximum radial dimension of the post is selected so that a circular arc tangent to the maximum radius of the post will pass closely to the minimum radial dimension of the recess, preferably within 50% of the thickness of the slot, most preferably will pass tangent to or beyond the minor axis of the recess.

Because of this configuration, even if a determined thief is able to hand-fabricate a driver having outer walls to match the curvilinear recess of the anti-tamper fastener, the thief will be unable to drill a hole in the tool of sufficient diameter to clear the center post of the fastener without the drill breaking through the outer walls of the driver, rendering it useless.

Additionally, because the center post is not cylindrical, the drive tool engages both the recess and the post, so that the post carries some of the applied torque. This permits a greater toque to be applied than with a fastener having a cylindrical center post where only the walls of the recess carry the applied torque. The curvilinear walls of the post and the recess may also include small protrusions which carry additional torque and make fabrication of an unauthorized driver even more difficult.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1A:
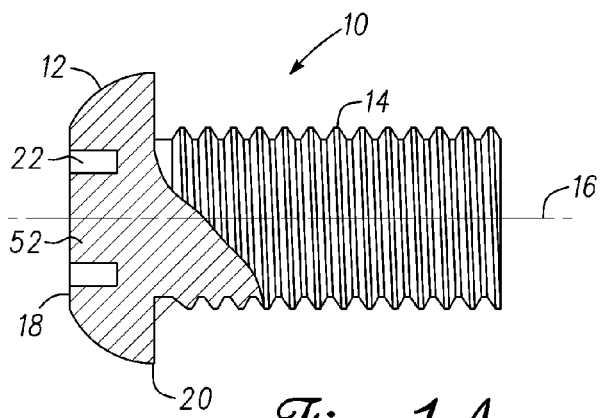
FIG. 1A is a partial cross-sectional side view of a threaded fastener incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIGS. 1A-1D, a threaded fastener 10 incorporating features of the present invention comprises a head portion 12 and a threaded portion 14 having male threads, which define the central axis 16 of fastener 10. In the illustrative embodiment, head portion 12 is frusto-spherical with an upper surface 18 and a generally circular perimeter edge 20 that is also concentric with central axis 16. Although in the illustrative embodiment, head portion 12 is frusto-spherical other head shapes such as frusto-conical or frusto-ogival, elliptical, pentagonal or other shapes that are difficult to grasp with locking pliers may be utilized and therefore are considered within the scope of the present invention. Additionally, although in the illustrative embodiment head portion 12 is concentric with central axis 16, head portion 12 may be eccentric from central axis 16.

Figure 1B:
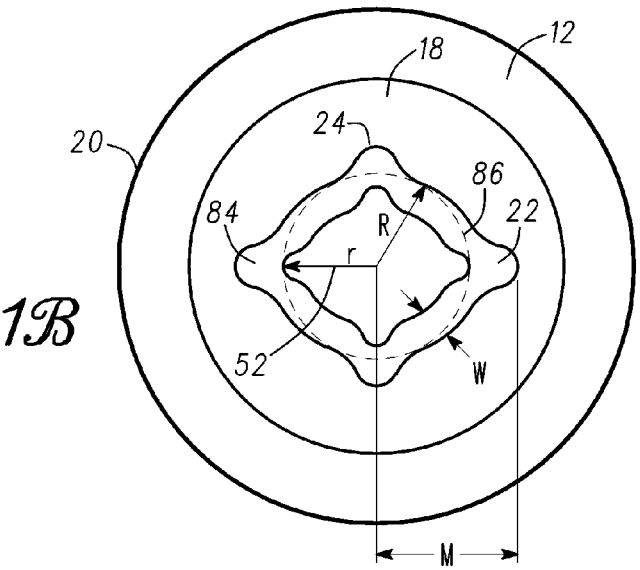
FIG. 1B is a top view of the threaded fastener of FIG. 1A.
Figure 1C:
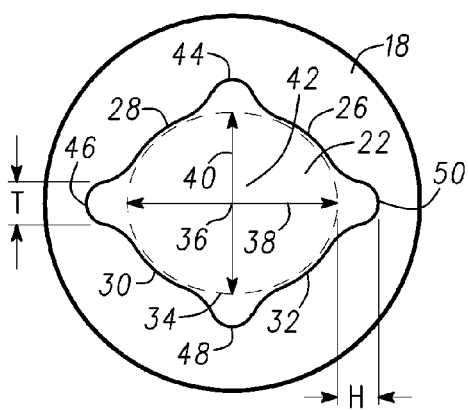
FIG. 1C is a partial top view of the threaded fastener of FIG. 1A showing details of the drive slot.

With particular reference to FIGS. 1B-1C, a recess 22 is formed in the upper surface 18 of head portion 12. Recess 22 has an inner wall 24 that is in the shape of a series of curvilinear surfaces 26, 28, 30, and 32 each of which lie on a single common elliptical path 34. As used herein the term "elliptical" and its variations mean and refer to a non-circular ellipse. Preferably at least two of the series of curvilinear surfaces 26, 28, 30, 32 lie in opposite quadrants of common elliptical path 34 so that the series of curvilinear surfaces 26, 28, 30, 32 have at least one plane of symmetry. In the illustrative embodiment, however, each of the series of curvilinear surfaces 26, 28, 30, 32 lie in the four quadrants of common elliptical path 34 so that the series of curvilinear surfaces 26, 28, 30, 32 have two planes of symmetry. In the illustrative embodiment, elliptical path 34 is generated from a centroid 36 that is on central axis 16 of threaded fastener 10 and has a major axis 38 and a minor axis 40 which lie along the diameters of circular perimeter 20, however elliptical path 34 may be generated from a centroid that is a predetermined radial distance from central axis 16 such as for example alternative centroid 42.

Figure 7:
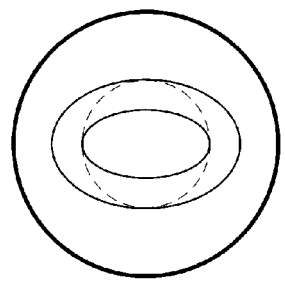
FIG. 7 is a top view of another alternative embodiment of a threaded fastener incorporating features of the present invention.

Curvilinear surfaces 26, 28, 30, 32 may join one to another so that recess 22 is an elliptical cylindrical opening (FIG. 7), however, in the illustrative embodiment curvilinear surfaces 26, 28, 30, 32 are joined together by a plurality of indentations 44, 46, 48, 50. Indentations 44, 46, 48, 50 blend smoothly into elliptical path 34 with convex fillets to optimize the drive angles between recess 22 and a corresponding drive tool (discussed more fully hereinafter). Indentations 44, 46, 48, 50 may be of any shape that extends outside of elliptical path 34 (curvilinear, triangular, rectangular, trapezoidal etc.) and need not be equal in size, however, indentations 44, 46, 48, 50 are preferably smaller in radius than the smallest radius of curvilinear surfaces 26, 28, 30, 32. In the illustrative embodiment, indentations 44, 46, 48, 50 are equal in size and are primarily concave with a height "H" equal to from 9-36% of the length of the major axis of elliptical path 34, preferably about 12-18% of the length of the major axis of elliptical path 34 and a width "T" also equal to from 9-36% of the length of the major axis of elliptical path 34, preferably about 12-18% of the length of the major axis of elliptical path 34 but in no event is the width "T" more than 30 degrees of arc, preferably no more than 20 degrees of arc (measured from the transition between the concave portion of the protrusion and the convex portion of the fillets). This ensures that the curvilinear surfaces 26, 28, 30, 32 form at least 360−n(20) degrees of the surface where "n" is the number of indentations (0 to 4), which if n=4 means curvilinear surfaces 26, 28, 30, 32 form at least 240 degrees of the surface, preferably at least 280 degrees of the surface. In the illustrative embodiment, for example, the major axis of elliptical path 34 is 0.4 inch, the minor axis of elliptical path 34 is 0.3 inch, the height of indentations 44, 46, 48, 50 are 0.05 inch and the concave radius of indentations 44, 46, 48, 50 is equal to 0.035 inch and fastener 10 is a ½-13 UNC screw. The foregoing dimensions can be scaled depending upon the thread size and head size of the particular fastener.

Figure 1D:
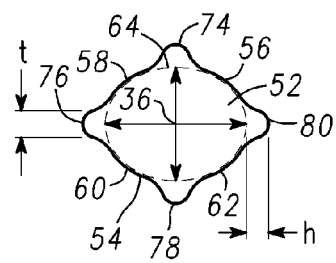
FIG. 1D is a partial top view of the threaded fastener of FIG. 1A showing details of the post within the drive slot.

With particular reference to FIGS. 1B-1D, head portion 12 includes a post 52 formed inside of recess 22. Post 52 may be taller or shorter than the depth of recess 22, however, in the illustrative embodiment, post 52 is the same height as the depth of recess 22 so that it is flush with the upper surface 18 of head portion 12. Post 52 has an outer wall 54, that is in the shape of a series of curvilinear surfaces 56, 58, 60, 62, each of which lie on a common elliptical path 64. Elliptical path 64 shares a common origin with elliptical path 34 (i.e. centroid 36) and includes major axis 68 and minor axis 70 that are co-linear with major axis 38 and minor axis 40, respectively so that elliptical path 64 and elliptical path 34 are aligned and concentric. Preferably at least two of the series of curvilinear surfaces 56, 58, 60, 62 lie in opposite quadrants of common elliptical path 64 so that the series of curvilinear surfaces 56, 58, 60, 62 have at least one plane of symmetry. In the illustrative embodiment, however, each of the series of curvilinear surfaces 56, 58, 60, 62 lie in opposite quadrants of common elliptical path 64 so that the series of curvilinear surfaces 56, 58, 60, 62 have two planes of symmetry.

Curvilinear surfaces 56, 58, 60, 62 may join one another to form an elliptical cylinder, however, in the illustrative embodiment curvilinear surfaces 56, 58, 60, 62 are joined together by a plurality of protrusions 74, 76, 78, 80. Protrusions 74, 76, 78, 80 blend smoothly into elliptical path 64 with concave fillets to optimize the drive angles between post 52 and a corresponding drive tool. Protrusions 74, 76, 78, 80 may be of any shape that extends outside of elliptical path 64 and need not be equal in size, however, protrusions 74, 76, 78, 80 are smaller in radius than the smallest radius of curvilinear surfaces 56, 58, 60, 62. In the illustrative embodiment, protrusions 74, 76, 78, 80 are equal in size and are convex with a height "h" equal to from 9-36% of the length of the major axis of elliptical path 64, preferably about 12-18% of the length of the major axis of elliptical path 64 and a width "t" also equal to from 9-36% of the length of the major axis of elliptical path 64, preferably about 12-18% of the length of the major axis of elliptical path 64 but in no event is the width "t" more than 30 degrees of arc, preferably no more than 20 degrees of arc (measured from the transition between the convex portion of the protrusion and the concave portion of the fillets). This ensures that the curvilinear surfaces 56, 58, 60, 62 form at least 360−n(20) degrees of the surface where "n" is the number of protrusions (0 to 4), which if n=4 means curvilinear surfaces 56, 58, 60, 62 form at least 240 degrees of the surface, preferably at least 280 degrees of the surface.

With particular reference to FIG. 1B, because recess 22 and post 52 are generated from elliptical paths that are concentric and aligned, inner wall 24 of recess 22 and outer wall 54 of post 52 define a slot 84 having a relatively uniform width "W" and therefore an average width having relatively little variance. For reasons that will be explained more fully hereinafter, the maximum radial dimension of post 52 "r" (i.e. the largest dimension measured across the face) is chosen so that the following equation is satisfied:

$$M > r \geq R - \frac{w}{2}$$

where M is the maximum radial dimension of the inner wall 24 of recess 22, R is the minimum radial dimension of the inner wall 24 of recess 22 and "w" is the average width of slot 84. In the illustrative embodiment, the maximum radial dimension "r" of post 52 is selected to be equal to the minimum radial dimension "R" of recess 22 and therefore a concentric circle 86 drawn tangent to maximum radial dimension "r" touches inner wall 24 of recess 22.

Figure 2A:
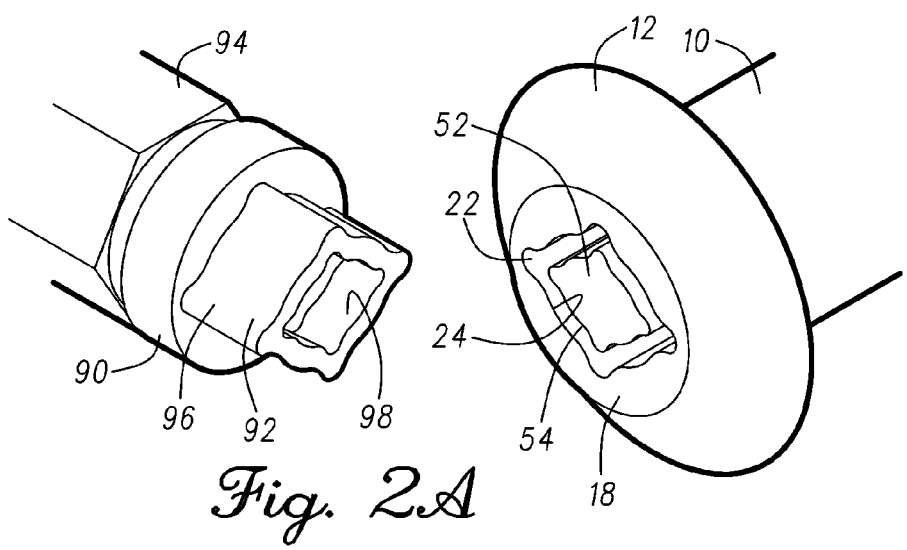
FIG. 2A is a perspective view of the threaded fastener of FIG. 1A and a corresponding drive tool.
Figure 2B:
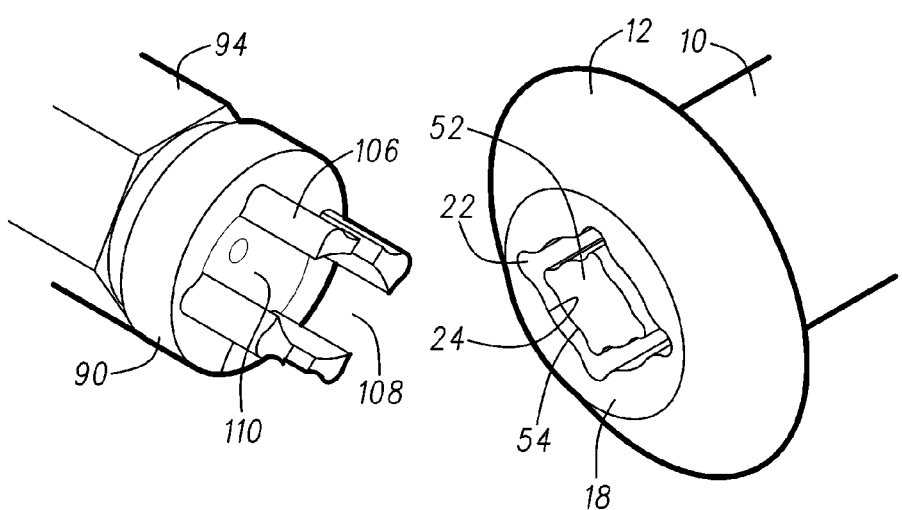
FIG. 2B is a perspective view of the threaded fastener of FIG. 1A and an inoperative drive tool.

With additional reference to FIGS. 2A-2B, a corresponding drive tool 94 driving threaded fastener 10 comprises an upright wall 92 extending from a handle portion 94, which may be a conventional hexagonal cylinder that can be driven by a socket wrench, box end wrench, etc. Upright wall 92 has an outer surface 96 that conforms to the size and shape of inner wall 24 of recess 22. Upright wall 92 has an inner surface 98 that conforms to the size and shape of outer wall 54 of post 52. Having both outer and inner surfaces of upright wall 92 engage features of threaded fastener 10 enables drive tool 94 to engage recess 22 and post 52 so that recess 22 and post 52 carry the torque applied by drive tool 94.

As noted previously, the maximum radial dimension "r" of post 52 is chosen so that the following equation is satisfied:

$$M > r \geq R - \frac{w}{2}$$

where M is the maximum radial dimension of the inner wall 24 of recess 22, R is the minimum radial dimension of the inner wall 24 of recess 22 and "w" is the average width of slot 84. Because of this relationship if, as shown in FIG. 2B, an unauthorized person manages to fabricate a tool 100 with an upright wall 102 having an outer surface 106 that conforms to the shape of inner wall 24 of recess 22, it will be impossible to drill a hole of sufficient diameter to clear post 52 without significantly compromising the thickness and therefore the strength of upright wall 102. Preferably "r" is selected so that the thickness of upright wall is reduced by at least 50%, preferably by at least 75% and most preferably the thickness is reduced to zero. In the illustrative embodiment where the maximum radial dimension "r" of post 52 is selected to be equal to the minimum radial dimension "R" of recess 22, a hole of sufficient diameter to clear post 52 will reduce the thickness of upright wall to zero, i.e. it will break through the walls of upright wall 102 (as shown at reference 108, 110), which renders the homemade tool useless.

Figure 3A:
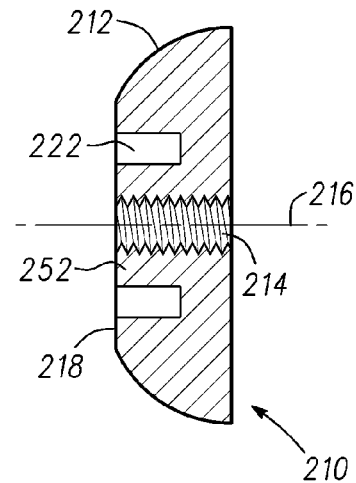
FIG. 3A is a cross-sectional view of an alternative embodiment of a threaded fastener incorporating features of the present invention.
Figure 3B:
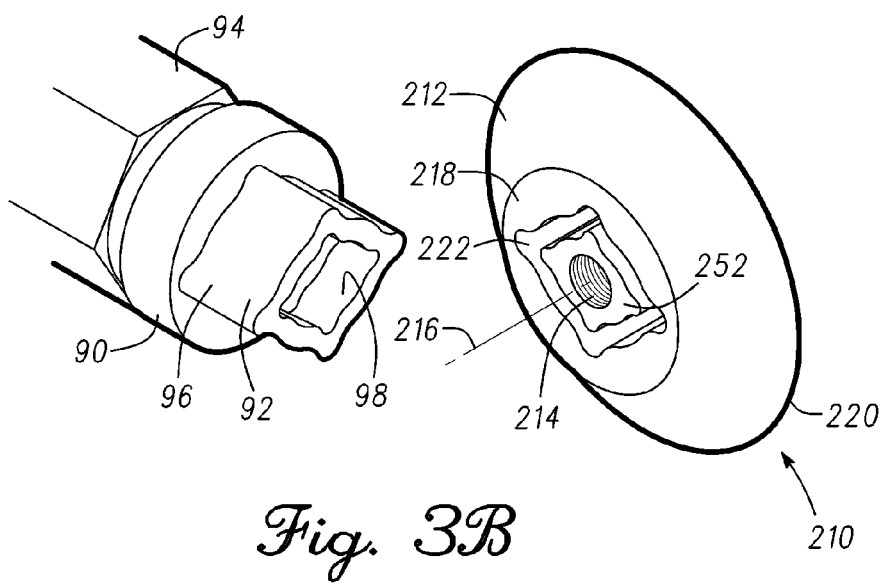
FIG. 3B is a perspective view of the threaded fastener of FIG. 3A and a corresponding drive too

With reference to FIGS. 3A-3B, in an alternative embodiment threaded fastener 210 comprises a head portion 212 and a threaded portion 214 comprising female threads defining a central axis 216. In the illustrative embodiment, threaded fastener 210 is frusto-spherical with an upper surface 218 and a generally circular perimeter edge 220 that is concentric with central axis 220. A recess 222 with a central post 252 is formed in the upper surface 218 of head portion 212. The configuration of the inner wall of recess 222 and the outer wall of central post 252 is identical to that of recess 22 and post 52 of threaded fastener 10 and therefore will not be discussed in detail herein, other than to observe that since threaded portion 214 comprises female threads, threads 214 pass through the center of central post 252.

Figure 4:
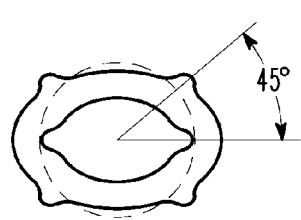
FIG. 4 is a top view of an alternative embodiment of a threaded fastener incorporating features of the present invention.
Figure 5:
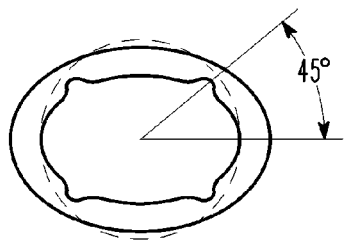
FIG. 5 is a top view of another alternative embodiment of a threaded fastener incorporating features of the present invention.
Figure 8:
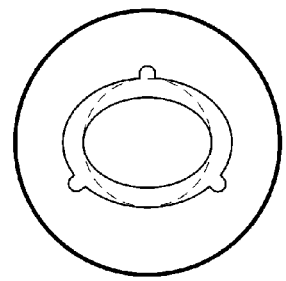
FIG. 8 is a top view of another alternative embodiment of a threaded fastener incorporating features of the present invention.

With further reference to FIGS. 4-5 and 8, although in the illustrative embodiment of FIGS. 1A-1D, the indentations and protrusions are aligned with the major and minor axes of the elliptical paths, other orientations may be employed, for example any combination of 10° 20° 30° or even 45° relative to the major and minor axes of the elliptical paths (as shown in FIGS. 4-5), and therefore other orientations are considered within the scope of the invention.

Figure 6:
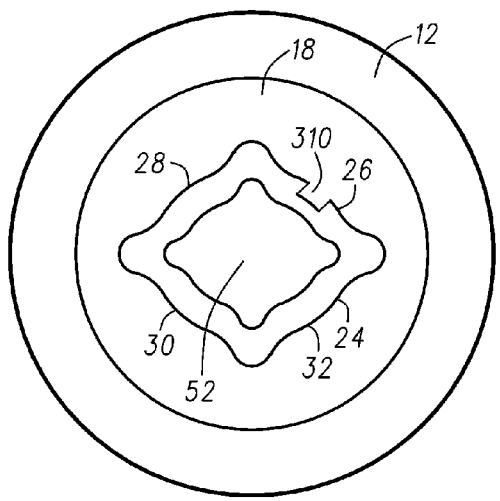
FIG. 6 is a top view of another alternative embodiment of a threaded fastener incorporating features of the present invention.

With additional reference to FIG. 6, additional security may be provided by including an inwardly extending key 310 protruding from inner wall 24 of recess 22. Inwardly extending key 310 will ordinarily extend into slot 22 by no more than W/2, otherwise the drive flange of an authorized tool would be weakened unacceptably. Preferably, inwardly extending key 310 will extend into slot 22 by only about 0.010 to 0.020 inch for a ½ inch threaded fastener.

Figure 9:
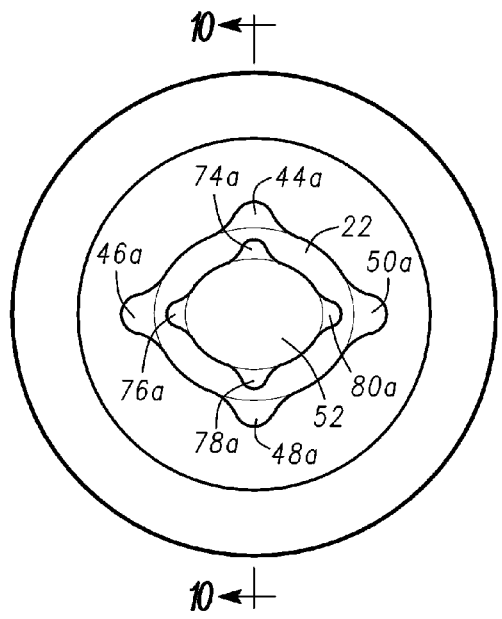
FIG. 9 is a top view of another alternative embodiment of a threaded fastener incorporating features of the present invention.
Figure 10:
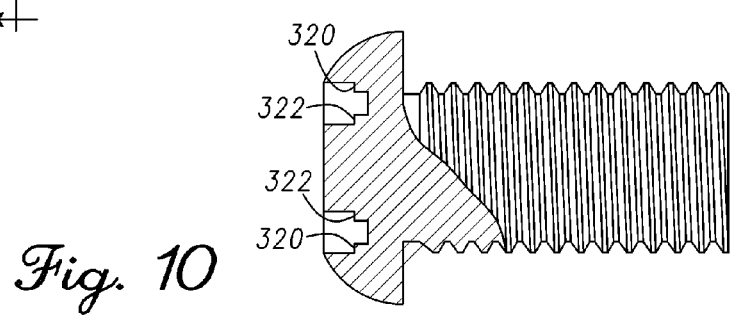
FIG. 10 is cross sectional view of the embodiment of FIG. 9 taken along line 10-10.

Indentations 44, 46, 48, 50 and protrusions 74, 76, 78, 80 may extend the full depth of recess 22 and the full height of center post 52 as shown in the illustrative embodiment of FIGS. 1A-1-D. However, as shown in FIGS. 9-10, indentations 44a, 46a, 48a, and 50a may also extend less than the full depth of recess 22a so that there is a step 320 at the bottom of one or more of indentations 44a, 46a, 48a, and 50a. Similarly protrusions 74a, 76a, 78a, and 80a may extend less than the full height of post 52a so that there is a step 322 at the bottom of one or more of indentations 44a, 46a, 48a, and 50a. Steps 320 and/or 322 further improve the security of threaded fastener 10 because an unauthorized driver, even one with the correct profile, cannot be inserted fully into recess 22 unless it also has the correct number of steps formed in the corresponding indentations and protrusions.

Although certain illustrative embodiments and methods have been disclosed herein, it will be apparent from the foregoing disclosure to those skilled in the art that variations and modifications of such embodiments and methods may be made without departing from the invention. For example although the illustrative embodiment of FIGS. 1A-1D include four protrusions in the outer wall of the post and four indentations in the inner wall of the slot, any number of protrusions or indentations from 0 (FIG. 7) to 4 or more are considered to be within the scope of the invention.

Finally, although in the illustrative embodiment the post and recess are generally elliptical, any concentric noncircular geometric shapes (with or without protrusions) having at least one plane of symmetry in which the maximum radial dimension of the post is selected so that a circular arc tangent to the maximum radius of the post will pass closely to the minimum radial dimension of the recess, such as concentric triangular or pentagonal prisms (with or without rounded corners), may be used since these will produce a generally uniform drive slot, yet it will remain impossible to fabricate a corresponding tool using a drill. Additionally, a kinematic inversion is contemplated wherein the fastener would have upright walls similar to the driver depicted in FIG. 2A and the driver would have a slot similar to the fastener depicted in FIG. 2A. Accordingly, it is intended that the invention should be limited only to the extent required by the appended claims and the rules and principles of applicable law. Additionally, as used herein, references to direction such as "up" or "down" are intend to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater.

What is claimed is:

1. A threaded fastener having tamper-resistant qualities, comprising:
   a threaded portion defining a fastener axis;
   a head portion, said head portion having an upper surface with a recess formed therein, the recess having an inner wall comprising a first series of curvilinear surfaces joined together and lying along a first elliptical path generated from a centroid, the centroid being located a predetermined radial distance from the fastener axis, said first elliptical path having a major axis and a minor axis, the first series of curvilinear surfaces forming at least 240 degrees of an elliptical surface along the first elliptical path; the inner wall of the recess further comprising at least one indentation disposed between adjacent surfaces of the first series of curvilinear surfaces, said at least one indentation extending radially outward from the first elliptical path, the indentation comprising a curvilinear profile having a radius that is less than the smallest radius of the first series of curvilinear surfaces.

2. The threaded fastener of claim 1, wherein:
said at least one indentation is aligned with one of the major and minor axes of the first elliptical path.

3. The threaded fastener of claim 1, further comprising:
a post disposed within the recess, said post having an outer wall comprising a second series of curvilinear surfaces joined together and lying along a second elliptical path generated from the centroid, the second elliptical path also having a major diameter and a minor diameter, the post and the inner wall of the recess defining a slot having an average width;
the outer wall of the post further comprising a predetermined maximum radial dimension measured from the centroid, the maximum radial dimension "r" of the outer wall of the post being defined by the following equation:

$$M > r \geq R - \frac{w}{2}$$

where M is the maximum radial dimension of the inner wall of the recess, R is the minimum radial dimension of the inner wall of the recess and "w" is the average width of the slot.

4. The threaded fastener of claim 1, wherein:
the second elliptical path is substantially aligned with the first elliptical path such that the outer wall of the post and the inner wall of the recess define a slot having a substantially uniform width.

5. A threaded fastener having tamper-resistant qualities, comprising:
a threaded portion defining a fastener axis;
a head portion having an upper surface with a recess formed therein, the recess having an inner wall comprising a first series of curvilinear surfaces joined together and lying along a first elliptical path generated from a centroid, the centroid being located a predetermined radial distance from the fastener axis, said first elliptical path having a major axis and a minor axis, the first series of curvilinear surfaces forming at least 240 degrees of an elliptical surface along the first elliptical path;
said head portion further comprising a post having an outer wall, said post comprising a second series of curvilinear surfaces joined together and lying along a second elliptical path generated from the centroid, the second elliptical path also having a major diameter and a minor diameter, the outer wall of the post and the inner wall of the recess defining a slot having an average width;
the outer wall of the post further comprising a predetermined maximum radial dimension measured from the centroid, the maximum radial dimension "r" of the outer wall of the post being defined by the following equation:

$$M > r \geq R - \frac{w}{2}$$

where M is the maximum radial dimension of the inner wall of the recess, R is the minimum radial dimension of the inner wall of the recess and "w" is the average width of the slot.

6. The threaded fastener of claim 5, wherein
the head portion has a generally circular perimeter disposed about the fastener axis, the head portion further comprising a frusto-spherical outer surface.

7. The threaded fastener of claim 5, wherein:
the inner wall of the recess further comprises at least one indentation disposed between adjacent surfaces of the first series of curvilinear surfaces, said at least one indentation extending radially outward from the first elliptical path, the indentation comprising an curvilinear profile having a radius that is less than the smallest radius of the first series of curvilinear surfaces.

8. The threaded fastener of claim 7, wherein:
said at least one indentation is aligned with one of the major and minor axes of the first elliptical path.

9. The threaded fastener of claim 7, wherein:
said at least one indentation is centered at least 2 degrees from the major and minor axes of the first elliptical path.

10. The threaded fastener of claim 5, wherein:
the outer wall of the post further comprises at least one protrusion disposed between adjacent surfaces of the second series of curvilinear surfaces, said at least one protrusion extending radially outward from the second elliptical path, said at least one protrusion having a radius that is less than the smallest radius of the second series of curvilinear surfaces.

11. The threaded fastener of claim 10, wherein:
said at least one protrusion is aligned with the major axis of the second elliptical path.

12. The threaded fastener of claim 5, wherein:
the maximum radial dimension "r" of the outer wall of the post is defined by the following equation:

$$M > r \geq R$$

where M is the maximum radial dimension of the inner wall of the recess and R is the minimum radial dimension of the inner wall of the recess.

13. The threaded fastener of claim 5, further comprising:
a shank portion extending from the head portion, the shank portion having external threads adapted to engage female threads of a mating part.

14. The threaded fastener of claim 5, wherein:
the post further comprises a central bore having female threads formed therein adapted to engage male threads of a mating part.

15. The threaded fastener of claim 5, wherein:
the second elliptical path is substantially aligned with the first elliptical path such that the outer wall of the post and the inner wall of the recess define a slot having a substantially uniform width.

16. A threaded fastener having tamper-resistant qualities, comprising:
a threaded portion defining a fastener axis;
a head portion having an upper surface with a recess formed therein, the recess having an inner wall comprising a first series of curvilinear surfaces joined together and lying along a first elliptical path generated from a centroid, the centroid being located a predetermined radial distance from the fastener axis;
said head portion further comprising a post having an outer wall, said post comprising a second series of curvilinear surfaces joined together and lying along a second elliptical path generated from the centroid and aligned with the first elliptical path, the second elliptical path also having a major diameter and a minor diameter, the outer wall of the post further comprising at least one protrusion disposed between adjacent surfaces of the second series of curvilinear surfaces, said at least one protrusion extending radially outward from the second elliptical path, said at least one protrusion having a radius that is less than the smallest radius of the second series of curvilinear surfaces, the outer wall of the post and the inner wall of the recess defining a slot having an average width;

wherein the outer wall of the post further comprises a predetermined maximum radial dimension measured from the centroid, the maximum radial dimension "r" of the outer wall of the post being defined by the following equation:

$$M > r \geq R - \frac{w}{2}$$

where M is the maximum radial dimension of the inner wall of the recess, R is the minimum radial dimension of the inner wall of the recess and "w" is the average width of the slot.

17. The threaded fastener of claim 16, wherein:
the maximum radial dimension "r" of the outer wall of the post is defined by the following equation:

$$M > r \geq R$$

where M is the maximum radial dimension of the inner wall of the recess and R is the minimum radial dimension of the inner wall of the recess.

18. The threaded fastener of claim 16, wherein:
the inner wall of the recess further comprises at least one indentation disposed between adjacent surfaces of the first series of curvilinear surfaces, said at least one indentation extending radially outward from the first elliptical path, the indentation comprising an curvilinear profile having a radius that is less than the smallest radius of the first series of curvilinear surfaces.

19. The threaded fastener of claim 18, wherein:
the inner wall of the recess further comprises at least one inwardly extending key element extending into the slot.

* * * * *